(12) United States Patent
Kurose et al.

(10) Patent No.: US 8,297,832 B2
(45) Date of Patent: Oct. 30, 2012

(54) PROCESS FOR PRODUCING POLYAMIDE

(75) Inventors: Hideyuki Kurose, Niigata (JP);
Katsumi Shinohara, Niigata (JP);
Minoru Kikuchi, Niigata (JP);
Tomomichi Kanda, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 515 days.

(21) Appl. No.: 12/471,714

(22) Filed: May 26, 2009

(65) Prior Publication Data
US 2009/0299027 A1 Dec. 3, 2009

(30) Foreign Application Priority Data
May 29, 2008 (JP) ................. 2008-140772

(51) Int. Cl.
*B01F 7/00* (2006.01)
(52) U.S. Cl. ............... 366/325.8; 366/325.94; 366/309; 528/340; 528/347; 422/135
(58) Field of Classification Search ............. 366/325.94, 366/309, 325.8; 528/340, 347; 422/135
See application file for complete search history.

(56) References Cited

U.S. PATENT DOCUMENTS

| | | | |
|---|---|---|---|
| 5,053,201 A | 10/1991 | Yamauchi et al. | |
| 5,382,092 A | 1/1995 | Okamoto et al. | |
| 5,839,827 A * | 11/1998 | Ogata et al. | 366/325.94 |
| 6,657,037 B2 * | 12/2003 | Tanaka et al. | 528/170 |
| 2001/0012883 A1 | 8/2001 | Tanaka et al. | |
| 2006/0122360 A1 | 6/2006 | Tsujii et al. | |

FOREIGN PATENT DOCUMENTS

| | | |
|---|---|---|
| CN | 2681884 Y | 3/2005 |
| JP | 2-40229 | 2/1990 |

OTHER PUBLICATIONS

Derwent abs., JP 58112032, 1983.*
U.S. Appl. No. 12/473,546, filed May 28, 2009, Kikuchi, et al.
U.S. Appl. No. 13/119,262, filed May 31, 2011, Kanda, et al.
Extended Search Report issued May 9, 2012 in European Application No. 09161149.1.
Office Action issued Jul. 30, 2012, in Chinese Patent Application No. 200910143719.X, filed May 25, 2009 (with English-language Translation).

* cited by examiner

*Primary Examiner* — Shane Fang
(74) *Attorney, Agent, or Firm* — Oblon, Spivak, McClelland, Maier & Neustadt, L.L.P.

(57) ABSTRACT

A process for producing polyamide which comprises directly melt polymerizing a diamine component, which comprises 70% by mole or more of xylylenediamine comprising 20% by mole or more of para-xylylenediamine, and a dicarboxylic acid component in the substantial absence of solvents in a reaction apparatus of the batch type, wherein a stirring apparatus disposed in the reaction apparatus and used for stirring the melted polymer in the apparatus comprises: (1) a rotating shaft connected to a driving member for stirring, (2) two or more stirring rods disposed in the substantially vertical direction which are cylinder-shaped members or plate-shaped members moving along the circumference of a circle having the center at the rotating shaft, and (3) a connecting member which connects the rotating shaft and the stirring rods; distances between the center line of the rotating shaft and center lines of the two or more stirring rods are each 15% or greater of the inner diameter of the reaction apparatus; the connecting member and the rotating shaft are disposed above the liquid surface of the melted polymer; and stirring is conducted in a manner such that the circumferential speed of the stirring rods is 30 m/minute or greater.

11 Claims, 2 Drawing Sheets

PROCESS FOR PRODUCING POLYAMIDE

FIELD OF THE INVENTION

The present invention relates to a process for producing polyamide advantageously utilized for applications such as molding materials, bottles, sheets, films and fibers. More particularly, the present invention relates to a process for producing polyamide which comprises directly melt polymerizing a diamine component comprising 70% by mole or more of xylylenediamine and a dicarboxylic acid component in the absence of solvents.

BACKGROUND OF THE INVENTION

As the process for producing polyamide by polycondensation of a dicarboxylic acid component and a diamine component, in general, a process in which an aqueous solution of a nylon salt is obtained from the dicarboxylic acid component and the diamine component and, then, melt polymerization is conducted under pressure, is widely known.

A process in which a dicarboxylic acid component and a diamine component are directly melt polymerized in the absence of solvents without preparing an aqueous solution of a nylon salt is disclosed (JP 57(1982)-200420A). In this process, the diamine component is added while the temperature of the formed polymer is elevated at the melting point of the polymer or higher, and this process is economically advantageous since removal of water (water used in the aqueous solution of a nylon salt) and solvents by distillation is not necessary.

In this process, it is advantageous from the standpoint of the production that the boiling point of the diamine component is the same as or higher than the melting point of the formed polyamide. When the boiling point of the diamine component is lower than the melting point of the polyamide, the polycondensation does not proceed efficiently due to vaporization of the added diamine. The boiling point of xylylenediamine is about 274° C., which is relatively higher than boiling points of other diamines conventionally used for production of polyamides. For example, hexamethylenediamine has a boiling point of 199 to 205° C. Therefore, the process comprising directly melt polymerizing a dicarboxylic acid component and a diamine component in the absence of solvents is an advantageous process when xylylenediamine is used.

On the other hand, when a polyamide is produced using a reaction apparatus of the batch-type, portions of the polyamide and oligomers are left remaining after the polyamide is discharged from the reaction apparatus. Since, in general, these substances have great viscosities, these substances are attached to the inner wall of the apparatus, stirrer shafts and rotating shafts and remain in the reaction apparatus. In general, these substances are left remaining in the form of thin films and does not cause serious problems as long as these substances remain in this condition.

However, when the content of para-xylylenediamine in xylylenediamine is 20% by mole or greater, substances attached in the block form are formed in the area in the vicinity of the interface of the gas and the liquid. This phenomenon arises since the formed polyamide exhibits a higher temperature of crystallization and a greater rate of crystallization as the content of para-xylylenediamine in the xylylenediamine is increased, and this change in the properties enhances the attachment. This phenomenon arises more markedly when the content of para-xylylenediamine is 30% by mole or greater. The polyamide attached in the area in the vicinity of the interface of the gas and the liquid is cooled in the gas phase area and tends to be crystallized, and the crystallization proceeds rapidly due to the great rate of crystallization. Even when the crystallized polyamide is heated at a temperature of the melting point or higher, re-melting thereof is more difficult than that of the polyamide in the amorphous condition, and the attachment proceeds more markedly.

The attachment described above tends to take place, in particular, at stirring shafts and rotating shafts since the temperature at these places is lower than at other places and the flow of the polymer tends to stagnates. The substances attached to stirring shafts and rotating shafts gradually grow by being coated with the polymer and form attached substances in the block form. This attached substances are subjected to heat history, and occasionally, the degree of polymerization is increased, and gels are formed.

The attached substances in the block form is occasionally peeled off during the production of the polyamide and mixed into the obtained product as white unmelted substances to deteriorate the quality of the product. The unmelted substances cause problems such as clogging of die holes during discharge of the polyamide from the reaction apparatus and interruption of strand formation, and the stable pelletizing operation is disturbed. Therefore, it is necessary that the reaction apparatus is periodically opened, and the attached substances are manually removed or washed off with solvents.

As the apparatus for decreasing the attached substances in an apparatus, a stirring blade which has a simple structure, and suppresses attachment of polymers to wall surfaces of a vessel and formation of blocks, as well as enables to operate for a long time with stability and a mixing apparatus equipped with the stirring blade are disclosed (JP 9(1997)-313912A). However, no descriptions can be found at all in the document on the attachment to stirring shafts or on the structure or the circumferential speed for suppressing the attachment to stirring shafts although the attachment to wall surfaces of a vessel is mentioned. As for the polymer for the treatment, no descriptions can be found at all on polyamides.

As the process for preventing attachment of a polymer to the inner wall of the reaction apparatus and a stirring shaft in the area in the vicinity of the interface of the gas and the liquid using a simple means, a process in which the liquid phase portion and the gas phase portion are stirred by stirring blades and the gas phase portion is cooled in the polymerization of a polymerizable monomer in a reaction apparatus of the stirred vessel type, is disclosed (JP 10(1998)-158307A). However, in this method, it is described that the process is a process for producing methacrylic polymers, and no descriptions can be found on polyamides. The stirring apparatus is not particularly limited as long as the apparatus can stir the surface of the reaction fluid and the gas phase portion, and no descriptions can be found on the shape.

Under the above circumstances, when a polyamide is produced by directly melt polymerizing a dicarboxylic acid component and a diamine component in the absence of solvents using xylylenediamine comprising 20% by mole or more of para-xylylenediamine, a process in which attachment of substances in the block form to a stirring apparatus is suppressed to increase the efficiency of the production and to decrease contamination of the obtained product with unmelted substances derived from the attached substances, has been desired.

SUMMARY OF THE INVENTION

The present invention has an object of providing a process for batch production of polyamide which comprises directly melt polymerizing a diamine component comprising para-xylylenediamine and a dicarboxylic acid component in the substantial absence of solvents, in accordance which the formation of substances in the block form attached to the stirring apparatus is suppressed to increase the efficiency of the production and to decrease contamination of the obtained product with unmelted substances derived from the attached substances.

As the result of the intensive studies by the present inventor to achieve the above object, it was found that the formation of attached substances in the block form and the contamination with unmelted substances could be decreased by using a stirring apparatus having a specific shape and by stirring under a specific condition. The present invention has been completed based on the knowledge.

The present invention provides a process for producing polyamide which comprises directly melt polymerizing a diamine component, which comprises 70% by mole or more of xylylenediamine comprising 20% by mole or more of para-xylylenediamine, and a dicarboxylic acid component in substantial absence of solvents in a reaction apparatus of a batch type, wherein a stirring apparatus disposed in the reaction apparatus and used for stirring melted polymer in the apparatus comprises:
(1) a rotating shaft connected to a driving member for stirring,
(2) two or more stirring rods disposed in a substantially vertical direction which are cylinder-shaped members or plate-shaped members moving along circumference of a circle having a center at the rotating shaft, and
(3) a connecting member which connects the rotating shaft and the stirring rods;

distances between a center line of the rotating shaft and center lines of the two or more stirring rods are each 15% or greater of an inner diameter of the reaction apparatus;

the connecting member and the rotating shaft are disposed at positions above a liquid surface of the melted polymer; and stirring is conducted in a manner such that a circumferential speed of the stirring rods is 30 m/minute or greater.

Figure 1:
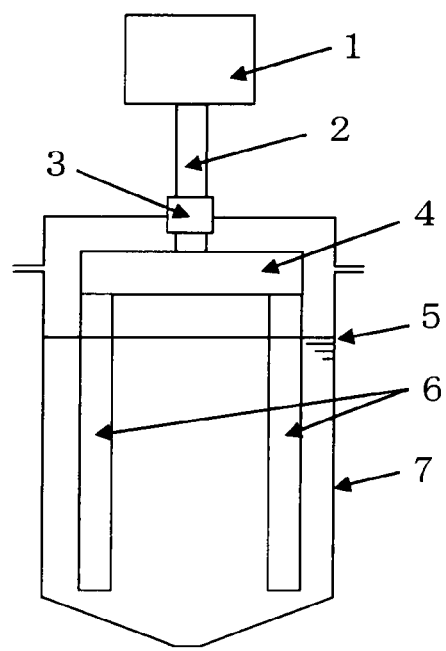
FIGS. 1, 2 and 3 each shows a schematic sectional view exhibiting examples of a stirring apparatus and a reaction apparatus in an embodiment for conducting the process of the present invention.

In the Figures, reference numerals mean as follows: 1: a driving member for stirring; 2: a rotating shaft; 3: a sealing portion for stirring; 4: a horizontal cylinder-shaped member; 5: a liquid surface; 6: vertical cylinder-shaped members; 7: a reaction apparatus; 8: paddle-shaped blades; and 9: a spiral belt-shaped blade.

DETAILED DESCRIPTION OF THE INVENTION

In the present invention, the polymerization is conducted by supplying the dicarboxylic acid component into the reaction apparatus, followed by adding the diamine component. The diamine component comprises 70% by mole or more of xylylenediamine comprising 20% by mole or more of para-xylylenediamine. From the standpoint of the crystallization, a diamine component comprising 70% by mole or more of xylylenediamine comprising 30% by mole or more of para-xylylenediamine is preferable, and a diamine component comprising xylylenediamine comprising 30% by mole or more of para-xylylenediamine is more preferable.

Examples of the dicarboxylic acid component include dicarboxylic acids such as adipic acid, succinic acid, sebacic acid, dodecane diacid, isophthalic acid, terephthalic acid and naphthalenedicarboxylic acid. The dicarboxylic acid component may comprise the above dicarboxylic acid singly or in combination of two or more. From the standpoint of the general use, adipic acid is preferable among the above acids. It is more preferable that 70% by mole or more of the dicarboxylic acid component is adipic acid.

Examples of the xylylenediamine other than para-xylylenediamine include meta-xylylenediamine and ortho-xylylenediamine. The xylylenediamine may comprise these diamines singly or in combination of two or more. In the present invention, it is preferable that the xylylenediamine is a two-component diamine comprising para-xylylenediamine and meta-xylylenediamine.

Examples of the diamine component other than the xylylenediamine include diamines such as 1,2-bis(aminomethyl)cyclohexane, 1,3-bis(aminomethyl)cyclohexane, 1,4-bis(aminomethyl)cyclohexane, trimethylenediamine, tetramethylenediamine, pentamethylenediamine, hexamethylenediamine, 1,7-diaminoheptane, 1,8-diaminooctane, 1,9-diaminononane, 1,10-diamionodecane, ortho-phenylenediamine, meta-phenylenediamine and para-phenylenediamine.

The component for forming the polyamide other than the diamine component and the dicarboxylic acid component is not particularly limited. Examples of the component for forming the polyamide other than the above components include lactams such as caprolactam, valerolactam, laurolactam and undecalactam, and aminocarboxylic acids such as 1,1-aminoundecanoic acid and 1,2-aminododecanoic acid.

Phosphorus compounds may be added to the polyamide so that coloring during the melt polymerization is suppressed. As the phosphorus compound, phosphoric acid, phosphorous acid, hypo-phosphorous acid, salts of these acids and ester compounds of these acids can be used. Examples of the salt of phosphoric acid include potassium phosphate, sodium phosphate, calcium phosphate, magnesium phosphate, manganese phosphate, nickel phosphate and cobalt phosphate. Examples of the ester of phosphoric acid include methyl phosphate, ethyl phosphate, isopropyl phosphate, butyl phosphate, hexyl phosphate, isodecyl phosphate, decyl phosphate, stearyl phosphate and phenyl phosphate. Examples of the salt of phosphorous acid include potassium phosphite, sodium phosphite, calcium phosphite, magnesium phosphite, manganese phosphite, nickel phosphite and cobalt phosphite. Examples of the ester of phosphorous acid include methyl phosphite, ethyl phosphite, isopropyl phosphite, butyl phosphite, hexyl phosphite, isodecyl phosphite, decyl phosphite, stearyl phosphite and phenyl phosphite. Examples of the salt of hypophosphorous acid include potassium hypophosphite, sodium hypophosphite, calcium hypophosphite, magnesium hypophosphite, manganese hypophosphite, nickel hypophosphite and cobalt hypophosphite. The phosphorus compound may be used singly or in combination of two or more.

As the process for adding the phosphorus compound, the phosphorus compound may be added to the diamine component or the dicarboxylic acid component which are the raw materials for the polyamide or may be added during the polymerization. However, in the present invention, the process is not limited to those described above.

For producing the polyamide, the diamine component and the dicarboxylic acid component are directly melt polymerized. From the standpoint of the cost of production, the polymerization is conducted in the substantial absence of solvents. The "substantial absence" naturally include the complete absence of solvents. This description further means that the presence of solvents in small amounts such that the effect of the present invention is not affected is not excluded.

The reaction apparatus of the batch type in the present invention is not particularly limited, and any reaction apparatus of the batch type can be used as long as the reaction apparatus has a structure which is equipped with the specific stirring apparatus described below and can be used as the reaction apparatus. It is preferable that a reaction apparatus designed so as to allow application of a pressure is used. It is preferable that the reaction apparatus is equipped with a partial condenser which can control the temperature of the surface of heat transfer so that distillation of the diamine component and the dicarboxylic acid component to the outside is suppressed.

The stirring apparatus for stirring the melted polymer in the present invention is mainly constituted with a rotating shaft connected to a driving member for stirring such as a motor, two or more stirring rods disposed in the substantially vertical direction which comprise cylinder-shaped members or plate-shaped members moving along the circumference of a circle having the center at the rotating shaft and a connecting member which connects the rotating shaft and the stirring rods. The shape of the stirring rod is selected from cylinder shapes such as circular cylinders, elliptic cylinders and prisms and plate shapes such as elliptic plates and right or oblique angular plates. Among these plates, circular cylinders, prisms and right or oblique angular plates are preferable from the standpoint of the general use. The ratio of the outer diameter d (m) (the length of the major axis in the case of an elliptic cylinder, the length of the diagonal line in the case of a prism and the width of the plate in the case of a plate) to the length in the vertical direction L (m) d/L is, in general, 1/5 to 1/25 and preferably 1/10 to 1/20 from the standpoint of the balance such as the center of gravity although the ratio is different depending on strength of materials and the physical properties of the substance to be stirred. It is sufficient that the stirring rod is disposed in the substantially vertical direction. The stirring rod may be slightly inclined with respected to the vertical direction or may have a slightly curved shape.

The shape of the connecting member connecting the rotating shaft and the stirring rods is not particularly limited as long as the shape causes no problems with respect to the strength. Examples of the shape include cylinder shapes and plate shapes in the horizontal direction. Circular cylinders, prisms and elliptic cylinders are preferable as the cylinder shape, and circular plates, right or oblique angular plates and elliptic plates are preferable as the plate shape. The material constituting the stirring rod and the connecting member is not particularly limited. Stainless steel is preferable from the standpoint of the resistance to corrosion and the strength.

The rotating shaft is disposed on the vertical line passing through the center of the section of the reaction apparatus in the horizontal direction or a position in the vicinity of the center. Two or more stirring rods move along the circumference of a circle having the center at the rotating shaft. The stirring rods may move along the circumference of the same circle or along circumferences of different circles. It is preferable that the stirring rods move along the circumference of the same circle. When the stirring rods move along circumferences of different circles, the flow of the polymer in the vicinity of the liquid surface becomes complicated, and there is the possibility that portions of stagnant flow are formed unexpectedly in the vicinity of the liquid surface around the stirring rod, thereby the attachment of the polymer may take place at such portions. Moreover, there is a fear that the force applied to the stirring apparatus becomes uneven.

The distances between the center line of the rotating shaft and the center lines of two or more stirring rods are each 15% or greater and preferably 17% or greater of the inner diameter of the reaction apparatus. When the distance is smaller than 15% of the inner diameter of the reaction apparatus, uniform stirring of the entire content of the reaction apparatus becomes difficult in the production of the polyamide, thereby the attachment easily takes place due to the deterioration of flow condition of the melted polymer in the reaction apparatus since the stirring rods are located at positions close to the center of the reaction apparatus. Since the rotation speed must be increased in order to increase the circumferential speed of the stirring rods, the rotation speed must be extremely increased when the distance is excessively small. This is not preferable due to the decrease in the efficiency. The distance has no particular upper limit. However, when the distance is excessively great, the clearance from the inner wall of the reaction apparatus is decreased, and there is a fear that the polymer is left remaining in the clearance after the polymer is discharged from the reaction apparatus. When it is considered that the inner wall of the reaction apparatus may be damaged during installation of the stirring apparatus into the reaction apparatus and that the stirring apparatus may be brought into contact with the inner wall of the reaction apparatus due to placement of the rotating shaft at a position shifted from the exact center of the reaction apparatus depending on the accuracy in the production of the apparatuses, it is preferable that the distance is 49% or smaller.

In the present invention, the rotating shaft and the connecting member connecting the rotating shaft and the stirring rods are both disposed above the liquid surface of the melted polymer, and it is preferable that both stay always above the liquid surface of the melted polymer. When the rotating shaft or the connecting member comes below the liquid surface of the melted polymer, i.e., when the rotating shaft or the connecting member is dipped into the melted polymer, the polymer tends to be attached to the rotating shaft or the connecting member even when this condition arises temporarily.

It is preferable that the stirring rods have blades to enhance the property for stirring. For example, the blade may be a belt-shaped blade disposed in a spiral shape in the vertical direction. In this case, it is preferable that the belt-shaped blade is disposed in a manner such that the vertical portions of the stirring rods are connected to the inner circumference of the blade having a spiral shape. However, the vertical portions of the stirring rods may be connected to the outer circumference of the blade having a spiral shape. When two or more blades having a spiral shape are disposed, it is preferable that the two or more blades are disposed in a manner such that the blades are axially symmetrical with respect to the center line of the rotating shaft.

As the blade other than the blade described above, it is preferable that a conventionally used blade is used. Specifically, at least one shape is selected from paddle shapes, propeller shapes, turbine shapes, wide plate shapes and multi-stage inclined plate shapes. The wide plate shape is a specific paddle shape having a relatively greater area than conventional paddle shapes. The multi-stage inclined plate shape is a shape in which a plurality of flat plates are attached to the stirring rod with inclined angles. It is preferable that the blades are disposed at the vertical portion of the stirring rod in a manner such that the blades are axially symmetrical with respect to the center line of the rotating shaft.

In the present invention, the stirring is conducted during the formation of the polyamide in a manner such that the circumferential speed of the stirring rod is 30 m/minute or greater, preferably 40 m/minute or greater. When the circumferential speed is smaller than 30 m/minute, the flow of polymer becomes stagnant in the vicinity of the liquid surface around the stirring rod, and the attachment of the polymer easily tends to take place. Therefore, such a circumferential speed is not preferable. The viscosity of the polyamide obtained in accordance with the process of the present invention is as great as 1,000 to 2,000 poises, and the fluidity of the polymer in the reaction apparatus of the batch type is greatly inferior to that of liquids exhibiting relatively good fluidity such as water. Therefore, it is considered to be important that the liquid at portions where the attachment easily tends to take place is forced to flow. From this standpoint, it was found that the attachment was suppressed by rotating the stirring rod at a circumferential speed of 30 m/minute or greater in the present invention. Although the circumferential speed of the stirring rod has no particular upper limit, it is preferable that the upper limit of the circumferential speed is 300 m/minute since there is the possibility that the cost of the apparatus is increased when the ability of the stirring apparatus is increased to increase the circumferential speed, and the attachment tends to be unexpectedly enhanced at a circumferential speed exceeding 300 m/minute due to swelling of the polymer surface pushed by the stirring rod. The circumferential speed of the stirring rod in the process of the present invention is calculated in accordance with the equation:

the circumferential speed (m/minute)=the radius of rotation (m)×2×π(the ratio of the circumference of a circle to its diameter)×the number of rotation (rpm)

wherein the radius of rotation is the distance between the center of rotation and the center of the stirring rod.

In the melt polymerization, 70% by mole or more of the diamine component is xylylenediamine. Therefore, the direct melt polymerization in which the polymerization is conducted by adding the diamine component continuously or intermittently to the melted dicarboxylic acid component is preferable since the time for removing solvents can be eliminated. When the dicarboxylic acid component is melted, it is preferable that the melting is conducted under the atmosphere of an inert gas such as nitrogen gas so that coloring by oxidation can be prevented. The melting of the dicarboxylic acid component may be conducted in the reaction apparatus, or the dicarboxylic acid component may be melted in a vessel specific for melting and, then, placed into the reaction apparatus. It is preferable to use the vessel specific for melting from the standpoint of increasing the efficiency of the use of the reaction apparatus.

In the present invention, the balance of the amounts by mole between the raw materials is selected as desired so that the polyamide having the desired balance of the amounts by mole of the components (such as a balance having an excess amount of the diamine component, a balance having an excess amount of the dicarboxylic acid component, and a balance having equimolar amounts of the components) is obtained. In an examples of the process for adjusting the balance of the amounts by mole of the components, the dicarboxylic acid component in the melted condition in the vessel for melting is weighed by a mass meter based on the sum of the weights of the component and the vessel for melting, and the weighed dicarboxylic acid component is supplied to the reaction apparatus, then, the diamine component is supplied to the reaction system while the vessel containing the diamine component is weighed by a mass meter. In the present invention, a mass meter such as a load cell and a balance is advantageously used when the diamine component and the dicarboxylic acid component are weighed.

When the diamine component is added to the melted dicarboxylic acid component, it is preferable that the melted dicarboxylic acid is heated at a temperature of 160° C. or higher at which the reaction of forming the amide substantially proceeds. It is also preferable that the reaction system is set at a temperature such that oligomers and/or low molecular polyamides formed as the intermediate products are kept in the melted condition, and the entire reaction system is kept in a uniform fluid condition. The addition is conducted, in general, at a temperature selected in the range of 180 to 290° C.

The operation of the addition of the diamine component comprises stirring the melted dicarboxylic acid component in the reaction apparatus, adding the diamine component continuously or intermittently, elevating the temperature of the reaction mixture gradually during the addition, and then keeping the temperature at a specific value. The period of time for the addition is not particularly limited. When the addition is excessively rapid, there is a fear that the rate of elevation of the temperature is decreased due to the insufficient ability of heating. The addition is conducted in the period of time selected, in general, in the range of 30 minutes to 5 hours and preferably in the range of 30 minutes to 4 hours although the period of time is different depending on the volume of the reaction apparatus and the ability of a heater or the like for heating.

Since the rate of elevation of the temperature depends on the heat of reaction for forming the polyamide, the latent heat of vaporization of condensation water and supplied heat, it is preferable that the rate of addition of the diamine component is suitably adjusted. When the addition is completed, the temperature of the reaction mixture is in the range of the melting point of the polyamide, at which the reaction mixture is in the melted condition, or higher and lower than (the melting point+35° C.), more preferably lower than (the melting point+15° C.) and still more preferably lower than (the melting point+5° C.).

Condensation water formed as the reaction proceeds is removed to the outside of the reaction system by distillation via a partial condenser and a condenser which are disposed where necessary. The diamine component removed by distillation to the outside of the reaction system as the vapor accompanied with the condensation water and the dicarboxylic acid component removed to the outside of the reaction system by sublimation are separated from water vapor by the partial condenser and recycled to the reaction apparatus.

It is preferable that the addition of the diamine component is conducted while the inside of the reaction apparatus is kept at the atmospheric pressure since the polymerization can be conducted under efficient removal of the formed condensation water. It is possible that the addition of the diamine component is conducted under pressure by using nitrogen gas or water vapor. In this case, the pressure is selected in the range of 0.9 MPaG or smaller and preferably 0.5 MPaG or smaller from the viewpoint of the efficiency of removal of the condensation water.

In accordance with the present invention, the attachment of the polymer and oligomers to the stirring apparatus can be prevented, the efficiency of production can be increased by decreasing the periodical cleaning, the pelletizing operation can be conducted with stability, and the polyamide exhibiting excellent quality can be obtained with suppressed contamination with unmelted substances.

The present invention will be described more specifically with reference to Examples and Comparative Examples in the following. However, the present invention is not limited to the examples.

EXAMPLE 1

A polyamide was synthesized as described in the following using a reaction apparatus of the batch type (the inner diameter: 180 mm; the height: 325 mm; made of stainless steel SUS316) equipped with a stirring apparatus (made of stainless steel SUS316), in which, as shown in FIG. 1, two circular cylinders in the vertical direction (stirring rods) having an outer diameter of 12 mm and a length of 240 mm were fixed in the vicinity of both end portions of a horizontal circular cylinder (a connecting member) having an outer diameter of 20 mm and a length of 150 mm, the distances between the center line of the rotating shaft and the center lines of the stirring rods were each 63 mm (35% of the inner diameter of the reaction apparatus), and the lower end portion of the rotating shaft, which was connected to a driving member for stirring at the upper end portion, was fixed at the middle of the connecting member. Adipic acid having a purity of 99.8% by weight in an amount of 1,960 g was melted by heating. When the temperature was elevated by the heating at 190° C., 1,820 g of xylylenediamine containing meta-xylylenediamine and para-xylylenediamine in relative amounts by mole of 7:3 (the purity of xylylenediamine: 99.8% by weight) was added dropwise over 4 hours while the elevation of the temperature was continued under the atmospheric pressure. The heating was adjusted in a manner such that the temperature at the inside was 268° C. when the dropwise addition of xylylenediamine was completed. After the addition of xylylenediamine was completed, the reaction mixture was kept at the same temperature for 15 minutes under the atmospheric pressure. Then, the pressure was reduced to 80 kPaA, and the reaction mixture was kept being stirred under the same condition for 10 minute. From the start of the addition of xylylenediamine to the period of reducing pressure, the connecting member was kept always above the liquid surface, and the stirring was conducted at a rotation speed of 76 rpm so that the circumferential speed of the stirring rod was 30 m/minute. Then, the stirring was discontinued, and the polymer was discharged from the bottom of the apparatus by applying a pressure to the inside of the reaction apparatus with nitrogen. When the condition of the attachment of the polymer to the stirring apparatus was examined by visual observation, it was confirmed that just thin films of the polymer were attached to the stirring rods, and substances attached in the block form were not found. The obtained product was melted and extruded at 270° C. using a single screw extruder having an inner diameter of the cylinder of 25 mm (L/D=26; a full flight screw) equipped with a T-die for molding films (the width: 200 mm), and 100 m of an unstretched film having a thickness of 50 μm and a width of 150 mm was prepared. The residence time in the extrusion of the polymer was 3 to 5 minutes. When the obtained film was examined by visual observation, no white unmelted substances were found.

EXAMPLE 2

The same procedures as those conducted in Example 1 were repeated except that two circular cylinders in the vertical direction (stirring rods) having an outer diameter of 12 mm and a length of 240 mm were fixed in the vicinity of both end portions of a horizontal circular cylinder (a connecting member) having an outer diameter of 20 mm and a length of 110 mm, the distances between the center line of the rotating shaft and the center lines of the stirring rods were each 40 mm (22% of the inner diameter of the reaction apparatus), and the stirring was conducted at a rotation speed of 120 rpm so that the circumferential speed of the stirring rod was 30 m/minute. When the condition of the attachment of the polymer to the stirring apparatus was examined by visual observation, it was confirmed that just thin films of the polymer were attached to the stirring rods, and substances attached in the block form were not found. When 100 m of a film prepared in accordance with the same procedures as those conducted for preparing the film in Example 1 was examined by visual observation, no white unmelted substances were found.

EXAMPLE 3

The same procedures as those conducted in Example 1 were repeated except that two prisms the in the vertical direction (stirring rods) having an outer diameter of 16 mm and a length of 240 mm were fixed in the vicinity of both end portions of a horizontal circular cylinder (a connecting member) having an outer diameter of 20 mm and a length of 110 mm, the distances between the center line of the rotating shaft and the center lines of the stirring rods were each 36 mm (20% of the inner diameter of the reaction apparatus), and the stirring was conducted at a rotation speed of 133 rpm so that the circumferential speed of the stirring rod was 30 m/minute. When the condition of the attachment of the polymer to the stirring apparatus was examined by visual observation, it was confirmed that just thin films of the polymer were attached to the stirring rods, and substances attached in the block form were not found. When 100 m of a film prepared in accordance with the same procedures as those conducted for preparing the film in Example 1 was examined by visual observation, no white unmelted substances were found.

EXAMPLE 4

The same procedures as those conducted in Example 1 were repeated except that two right angular plates in the vertical direction (stirring rods) having a width of 13 mm, a length of 240 mm and a thickness of 1 mm were fixed in the vicinity of both end portions of a circular cylinder (a connecting member) having an outer diameter of 20 mm and a length of 150 mm in a manner such that the flat face of the plate was perpendicular to the circumference of the circle of rotation, the distances between the center line of the rotating shaft and the center lines of the stirring rods were each 62 mm (34% of the inner diameter of the reaction apparatus), and the stirring was conducted at a rotation speed of 78 rpm so that the circumferential speed of the stirring rod was 30 m/minute. When the condition of the attachment of the polymer to the stirring apparatus was examined by visual observation, it was confirmed that just thin films of the polymer were attached to the stirring rods, and substances attached in the block form were not found. When 100 m of a film prepared in accordance with the same procedures as those conducted for preparing the film in Example 1 was examined by visual observation, no white unmelted substances were found.

EXAMPLE 5

Figure 2:
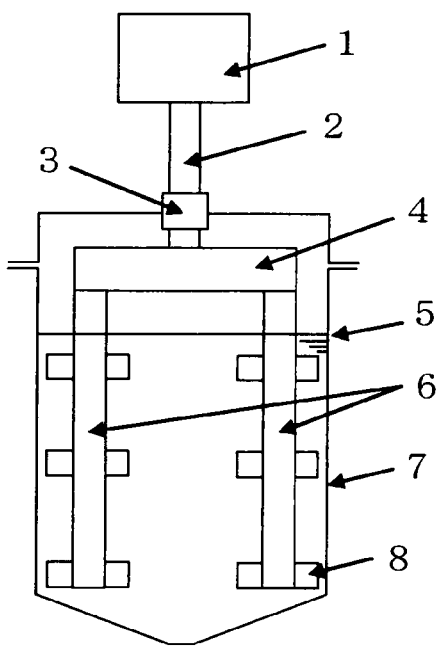

The same procedures as those conducted in Example 1 were repeated except that, as shown in FIG. 2, two circular cylinders in the vertical direction (stirring rods) having an outer diameter of 12 mm and a length of 240 mm were fixed in the vicinity of both end portions of a horizontal circular cylinder (a connecting member) having an outer diameter of 20 mm and a length of 110 mm, the distances between the center line of the rotating shaft and the center lines of the stirring rods were each 40 mm (22% of the inner diameter of the reaction apparatus), three paddle-shaped blades having a length in the vertical direction of 20 mm and a length in the horizontal direction of 60 mm were disposed axially symmetrically to each centerline of the stirring rod, and the stirring was conducted at a rotation speed of 120 rpm so that the circumferential speed of the stirring rod was 30 m/minute. When the condition of the attachment of the polymer to the stirring apparatus was examined by visual observation, it was confirmed that just thin films of the polymer were attached to the stirring rods, and substances attached in the block form were not found. When 100 m of a film prepared in accordance with the same procedures as those conducted for preparing the film in Example 1 was examined by visual observation, no white unmelted substances were found.

EXAMPLE 6

Figure 3:
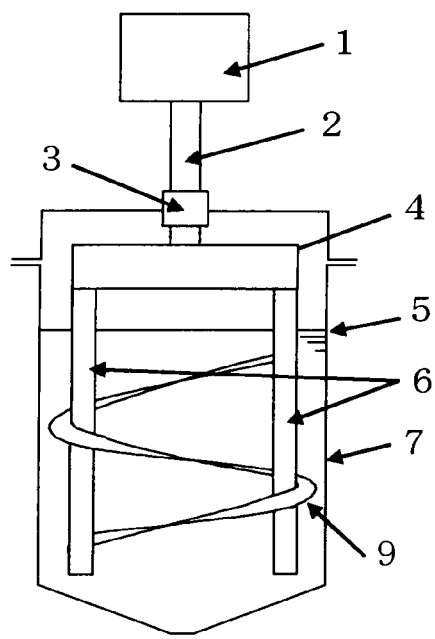

The same procedures as those conducted in Example 1 were repeated except that, as shown in FIG. 3, two circular cylinders in the vertical direction (stirring rods) having an outer diameter of 12 mm and a length of 240 mm were fixed in the vicinity of both end portions of a horizontal circular cylinder (a connecting member) having an outer diameter of 20 mm and a length of 110 mm, the distances between the center line of the rotating shaft and the center lines of the stirring rods were each 40 mm (22% of the inner diameter of the reaction apparatus), a single belt-shaped blade (the width: 12 mm; the thickness: 2 mm) was disposed spirally in the vertical direction around the center line of the rotation in a manner such that the inner circumference of the blade was connected to the outside of the stirring rods, and the stirring was conducted at a rotation speed of 120 rpm so that the circumferential speed of the stirring rod was 30 m/minute. When the condition of the attachment of the polymer to the stirring apparatus was examined by visual observation, it was confirmed that just thin films of the polymer were attached to the stirring rods, and substances attached in the block form were not found. When 100 m of a film prepared in accordance with the same procedures as those conducted for preparing the film in Example 1 was examined by visual observation, no white unmelted substances were found.

EXAMPLE 7

A polyamide was synthesized as described in the following using a reaction apparatus of the batch type (the inner diameter: 2,860 mm; the height: 3,200 mm; made of stainless steel SUS316) equipped with a stirring apparatus (made of stainless steel SUS316), in which, as shown in FIG. 1, two circular cylinders in the vertical direction (stirring rods) having an outer diameter of 150 mm and a length of 2,500 mm were fixed in the vicinity of both end portions of a horizontal circular cylinder (a connecting member) having an outer diameter of 200 mm and a length of 2,200 mm, the distances between the center line of the rotating shaft and the center lines of the stirring rods were each 1,000 mm (35% of the inner diameter of the reaction apparatus), and the lower end portion of the rotating shaft, which was connected to a driving member for stirring at the upper end portion, was fixed at the middle of the connecting member. Adipic acid having a purity of 99.8% by weight in an amount of 4,500 kg was melted by heating. When the temperature was elevated by the heating at 190° C., 4,160 kg of xylylenediamine containing meta-xylylenediamine and para-xylylenediamine in relative amounts by mole of 7:3 (the purity of xylylenediamine: 99.8% by weight) was added dropwise over 4 hours while the elevation of the temperature was continued under the atmospheric pressure. The heating was adjusted in a manner such that the temperature at the inside was 268° C. when the dropwise addition of xylylenediamine was completed. After the addition of xylylenediamine was completed, the reaction mixture was kept at the same temperature for 15 minutes under the atmospheric pressure. Then, the pressure was reduced to 80 kPaA, and the reaction mixture was kept being stirred under the same condition for 10 minutes. From the start of the addition of xylylenediamine to the period of reducing pressure, the connecting member was kept always above the liquid surface, and the stirring was conducted at a rotation speed of 48 rpm so that the circumferential speed of the stirring rod was about 300 m/minute. Then, the stirring was discontinued, and the polymer was discharged from the bottom of the apparatus by applying a pressure to the inside of the reaction apparatus with nitrogen. When the condition of the attachment of the polymer to the stirring apparatus was examined by visual observation, it was confirmed that thin films of the polymer were attached to the stirring rods, and a substance attached in the block form was also found although the amount was small. The obtained product was melted and extruded at 270° C. using a single screw extruder having an inner diameter of the cylinder of 25 mm (L/D=26; a full flight screw) equipped with a T-die for molding films (the width: 200 mm), and 100 m of an unstretched film having a thickness of 50 μm and a width of 150 mm was prepared. The residence time in the extrusion of the polymer was 3 to 5 minutes. When the obtained film was examined by visual observation, no white unmelted substances were found.

COMPARATIVE EXAMPLE 1

Figure 4:
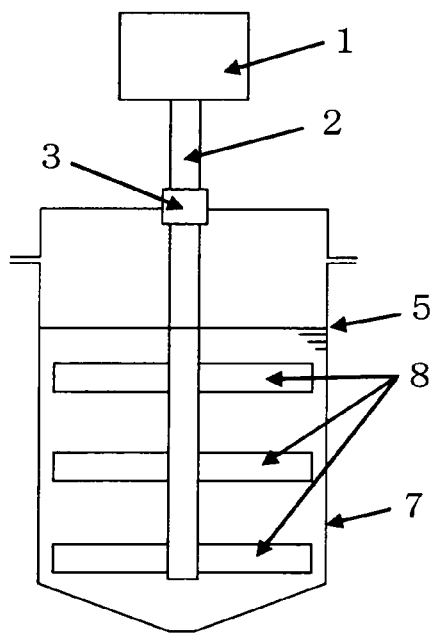
FIG. 4 shows a schematic sectional view exhibiting a conventional stirring apparatus and a conventional reaction apparatus used in Comparative Example 1.

A reaction apparatus of the batch type (the inner diameter: 180 mm; the height: 325 mm) equipped with a conventional stirring apparatus in which, as shown in FIG. 4, three blades of the paddle form (the length: 120 mm; the width: 10 mm) were disposed on the rotating shaft was used. Adipic acid having a purity of 99.8% by weight in an amount of 1,960 g was melted by heating. When the temperature was elevated by the heating at 190° C., 1,820 g of xylylenediamine containing meta-xylylenediamine and para-xylylenediamine in relative amounts by mole of 7:3 (the purity of xylylenediamine: 99.8% by weight) was added dropwise over 4 hours while the elevation of the temperature was continued under the atmospheric pressure. The heating was adjusted in a manner such that the temperature at the inside was 268° C. when the dropwise addition of xylylenediamine was completed. After the addition of xylylenediamine was completed, the reaction mixture was kept for 15 minutes under the atmospheric pressure. Then, the pressure was reduced to 80 kPaA, and the reaction mixture was kept being stirred under the same condition for 10 minutes. From the start of the addition of xylylenediamine to the period of reducing pressure, the stirring was conducted at a rotation speed of 80 rpm so that the circumferential speed of the tip of the paddle-shaped blade was 30 m/minute. Then, the stirring was discontinued, and the polymer was discharged from the bottom of the apparatus by applying a pressure to the inside of the reaction apparatus with nitrogen. When the condition of the attachment of the polymer to the stirring apparatus was examined by visual observation, it was confirmed that a great amount of the polymer in the block form was attached to the rotating shaft.

When 100 m of a film prepared in accordance with the same procedures as those conducted for preparing the film in Example 1 was examined by visual observation, it was confirmed that white unmelted substances were present.

COMPARATIVE EXAMPLE 2

The same procedures as those conducted in Example 1 were repeated except that two circular cylinders in the vertical direction (stirring rods) having an outer diameter of 12 mm and a length of 240 mm were fixed in the vicinity of both end portions of a horizontal circular cylinder having an outer diameter of 20 mm and a length of 65 mm, the distances between the center line of the rotating shaft and the center lines of the stirring rods were each 20 mm (11% of the inner diameter of the reaction apparatus), and the stirring was conducted at a number of rotation of 240 rpm so that the circumferential speed of the stirring rod was 30 m/minute. When the condition of the attachment of the polymer to the stirring apparatus was examined by visual observation, it was confirmed that the polymer in the block form was attached to the rotating shaft. When 100 m of a film prepared in accordance with the same procedures as those conducted for preparing the film in Example 1 was examined by visual observation, it was confirmed that white unmelted substances were present.

COMPARATIVE EXAMPLE 3

The same procedures as those conducted in Example 1 were repeated except that the stirring was conducted at a rotation speed of 50 rpm from the start of the addition of xylylenediamine to the period of reducing pressure so that the circumferential speed of the circular cylinders (the stirring rod) in the vertical direction was 20 m/minute. When the condition of the attachment of the polymer to the stirring apparatus was examined by visual observation, it was confirmed that the polymer in the block form was attached to the rotating shaft. When 100 m of a film prepared in accordance with the same procedures as those conducted for preparing the film in Example 1 was examined by visual observation, it was confirmed that white unmelted substances were present.

COMPARATIVE EXAMPLE 4

The same procedures as those conducted in Example 1 were repeated except that the circular cylinder (the connecting member) in the horizontal direction was temporarily (for 140 minutes) placed below the liquid surface during the period from the start of the addition of xylylenediamine to the period of reducing pressure. When the condition of the attachment of the polymer to the stirring apparatus was examined by visual observation, it was confirmed that the polymer in the block form was attached to the horizontal circular cylinder and to the rotating shaft fixed to the horizontal circular cylinder. When 100 m of a film prepared in accordance with the same procedures as those conducted for preparing the film in Example 1 was examined by visual observation, it was confirmed that white unmelted substances were present.

What is claimed is:

1. A process for producing a polyamide, which process comprises:
    directly melt polymerizing a diamine and a dicarboxylic acid in a substantial absence of solvents in a batch reaction apparatus with stirring to obtain a polyamide melt;
    wherein
        the diamine comprises 70% by mole or more of a xylylenediamine having 20% by mole or more of para-xylylenediamine,
        the stirring is obtained with a stirring apparatus in the batch reaction apparatus and the stirring apparatus comprises:
            (1) a rotating shaft connected to a driving member for stirring,
            (2) two or more stirring rods disposed in a substantially vertical direction which are cylinder-shaped members or plate-shaped members which move along a circumference of a circle having a center at the rotating shaft, and
            (3) a connecting member which connects the rotating shaft and the stirring rods;
        wherein
            distances between a center line of the rotating shaft and center lines of the two or more stirring rods are each 15% or greater of an inner diameter of the reaction apparatus;
            the circumference along which each rod moves is the same circle;
            the connecting member and the rotating shaft are located above a liquid surface of the stirring melted polyamide; and
            a circumferential speed of the stirring rods is 30 m/minute or greater.

2. The process for producing polyamide according to claim 1, wherein the xylylenediamine further comprises meta-xylylenediamine.

3. The process for producing polyamide according to claim 1 or 2, wherein the dicarboxylic acid comprises at least 70 mole % of adipic acid.

4. The process for producing polyamide according to claim 1, wherein the stirring rod has a belt-shaped blade formed in a spiral shape in a vertical direction.

5. The process for producing polyamide as described in claim 1, wherein the stirring rod has blades disposed axially symmetrically with respect to a center line of the stirring rod, and a shape of the blade is at least one shape selected from paddle shapes, propeller shapes, turbine shapes, wide plate shapes and multi-stage inclined plate shapes.

6. The process for producing polyamide as described in claim 1, wherein the diamine is added to melted dicarboxylic acid.

7. The process for producing polyamide as described in claim 6, wherein the diamine is added continuously or intermittently.

8. The process for producing polyamide as described in claim 6, wherein a temperature of the melted dicarboxylic acid is at least 160° C. when the diamine is added.

9. The process for producing polyamide as described in claim 8, wherein the temperature of the dicarboxylic acid melt is increased during the diamine addition.

10. The process for producing polyamide as described in claim 8, wherein the temperature is from 180 to 290° C.

11. The process for producing polyamide as described in claim 9, wherein when the addition is complete the temperature is from the melting point of the polyamide to a melting point +35° C.

* * * * *